Jan. 9, 1923.
C. C. BANCROFT.
PROCESS FOR REDUCING BITUMINOUS MATERIAL TO DUST.
FILED AUG. 24 1920.
1,441,904.
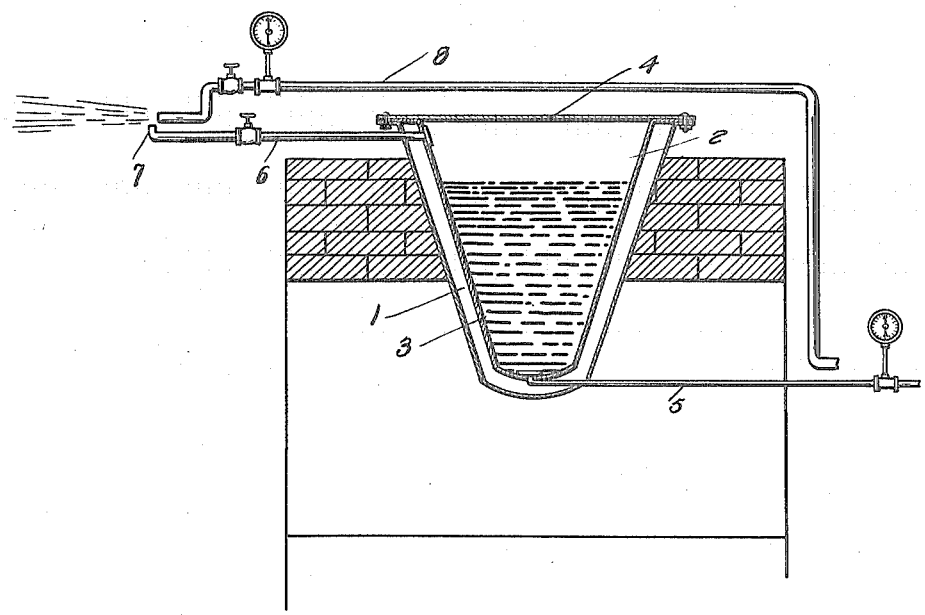
Inventor
C. C. Bancroft.

Patented Jan. 9, 1923.

1,441,904

UNITED STATES PATENT OFFICE.

CHARLES COTESWORTH BANCROFT, OF NEW ORLEANS, LOUISIANA.

PROCESS FOR REDUCING BITUMINOUS MATERIAL TO DUST.

Application filed August 24, 1920. Serial No. 405,564.

*To all whom it may concern:*

Be it known that I, CHARLES C. BANCROFT, a citizen of the United States, residing at New Orleans, in the parish of Orleans and State of Louisiana, have invented certain new and useful Improvements in Processes for Reducing Bituminous Material to Dust; and I do hereby declare the following to be a full, clear, and exact description of the invention, such as will enable others skilled in the art to which it appertains to make and use the same.

This invention relates to a process for reducing bituminous material from a solid form to an impalpable dust and it consists in the novel steps hereinafter described and claimed.

The materials which are treated by the process are solid bituminous or asphaltic material, whether natural or manufactured, the solid material is placed in a receptacle and heated to a sufficient degree to bring it to a liquid state, this liquid is then introduced through pipes to a spraying agent which is forced through other pipes under pressure whereby the solid material in a heated condition is subjected to the spraying agent which reduces the solid material to a fine dust and this dust cools while it is suspended in air which adds to the dust a light, fluffy condition, but the material in the dust form is not deprived of any of its natural gases or vapors which would be the case if the material was subjected to a process of evaporation or dehydration.

In the accompanying drawing the figure is a side elevation, parts in section of apparatus for executing or carrying out the process as stated.

In the apparatus a steam jacket 1 is employed, the said jacket holding a kettle 2 which contains the bituminous material indicated at 3. The kettle is closed by a lid 4. A pipe 5 communicates with the bottom of the kettle 2 and is adapted to convey compressed air into the kettle and under the material 3. A valve controlled pipe 6 is connected at one end with the upper portion of the kettle at a point above the bituminous material and the outer end of the said pipe is upturned forming a nozzle 7. A pipe 8 is adapted to convey air under pressure to the said nozzle and discharge the same transversely across the outlet of the nozzle. The bituminous material 3 is placed in the kettle and is heated by the steam in the jacket 1 or other heating agent whereby the said material is softened or partially melted. At the same time, the air under pressure is admitted into the bottom portion of the kettle through the pipe 5 and this air passes up through the molten bituminous material and aerates the same and carries off the smaller particles of the said bituminous material through the pipe 6 and the nozzle 7. At the same time a blast of air is discharged transversely across the outlet of the nozzle from the pipe 8 and this additional blast of air further breaks the particles into smaller bits or atoms and these particles are blown to one side in the aerated condition as stated.

Having described the invention what is claimed is:—

A process of atomizing consisting in heating the material in a closed vessel, passing air under pressure into the vessel under the material to aerate the material and urge it in the path of discharge from the vessel, in discharging the aerated material into the atmosphere, and in directing air under pressure into the material as it discharges into the atmosphere and in a path at an angle to the direction of discharge.

In testimony whereof I affix my signature in presence of two witnesses.

CHARLES COTESWORTH BANCROFT.

Witnesses:
L. R. MALONE,
Jos. M. SEGIN, Sr.